(12) United States Patent
Koch et al.

(10) Patent No.: US 10,748,718 B2
(45) Date of Patent: Aug. 18, 2020

(54) POWER CONTRACTOR WITH HIGH MECHANIC SHOCK RESISTANCE

(71) Applicant: TE Connectivity Germany GmbH, Bensheim (DE)

(72) Inventors: Harry Koch, Berlin (DE); Matthias Kroeker, Mittenwalde-Ragow (DE)

(73) Assignee: TE Connectivity Germany GmbH, Bensheim (DE)

( * ) Notice: Subject to any disclaimer, the term of this patent is extended or adjusted under 35 U.S.C. 154(b) by 118 days.

(21) Appl. No.: 15/637,296

(22) Filed: Jun. 29, 2017

(65) Prior Publication Data

US 2018/0005773 A1 Jan. 4, 2018

(30) Foreign Application Priority Data

Jun. 30, 2016 (DE) .................. 10 2016 211 931

(51) Int. Cl.
*H01H 50/24* (2006.01)
*H01H 9/00* (2006.01)
*B60L 3/04* (2006.01)
*H01H 50/34* (2006.01)
*H01M 2/34* (2006.01)
*B60L 3/00* (2019.01)
*H01H 9/30* (2006.01)
*H01H 51/27* (2006.01)
*H01H 51/22* (2006.01)
*B60W 20/00* (2016.01)
*H01H 9/36* (2006.01)
(Continued)

(52) U.S. Cl.
CPC .......... *H01H 9/0011* (2013.01); *B60L 3/0038* (2013.01); *B60L 3/0069* (2013.01); *B60L 3/04* (2013.01); *H01H 9/30* (2013.01); *H01H 50/24* (2013.01); *H01H 50/34* (2013.01); *H01M 2/347* (2013.01); *B60W 20/00* (2013.01); *H01H 51/2227* (2013.01); *H01H 51/27* (2013.01); *H01H 2009/367* (2013.01); *H01H 2009/526* (2013.01); *H01M 2/1077* (2013.01); *H01M 2220/20* (2013.01)

(58) Field of Classification Search
CPC . H01H 50/24; H01H 51/2227; H01H 51/2263
See application file for complete search history.

(56) References Cited

U.S. PATENT DOCUMENTS 2,591,773 A * 4/1952 Blanchet ................ H01H 50/24
335/276
5,880,654 A 3/1999 Yamaguchi et al.

FOREIGN PATENT DOCUMENTS

CH 522285 6/1972
CH 522285 A * 6/1972 ......... H01H 51/2227
(Continued)

OTHER PUBLICATIONS

Machine translation of DE-4300594.*
(Continued)

*Primary Examiner* — Ramon M Barrera
(74) *Attorney, Agent, or Firm* — Barley Snyder

(57) ABSTRACT

A power contactor having an electromagnetic driving unit, a rotating armature, and a reset element. The rotating armature is switched by the electromagnetic driving unit between an open position and a closed position. The reset element exerts a reset force onto the rotating armature when in the closed position.

20 Claims, 4 Drawing Sheets

(51) Int. Cl.
*H01H 9/52* (2006.01)
*H01M 2/10* (2006.01)

(56) References Cited

FOREIGN PATENT DOCUMENTS

| | | | |
|---|---|---|---|
| CN | 1167996 A | 12/1997 | |
| CN | 103295848 A | 9/2013 | |
| DE | 4300594 A1 * | 7/1994 | ......... H01H 51/2227 |
| DE | 4300594 A1 | 7/1994 | |
| WO | 9960593 A1 | 11/1999 | |

OTHER PUBLICATIONS

Machine translation of CH-522285.*
Abstract of CN103295848 (A), 1 page print date Apr. 3, 2020.
DE Office Action cited in co-pending application 10 2016 211 631.1 dated Feb. 7, 2020, 6 pages.
First Chinese Office Action, English translation, Chinese Patent Application No. 201710523004.1, dated Oct. 31, 2019, 10 pages.

* cited by examiner

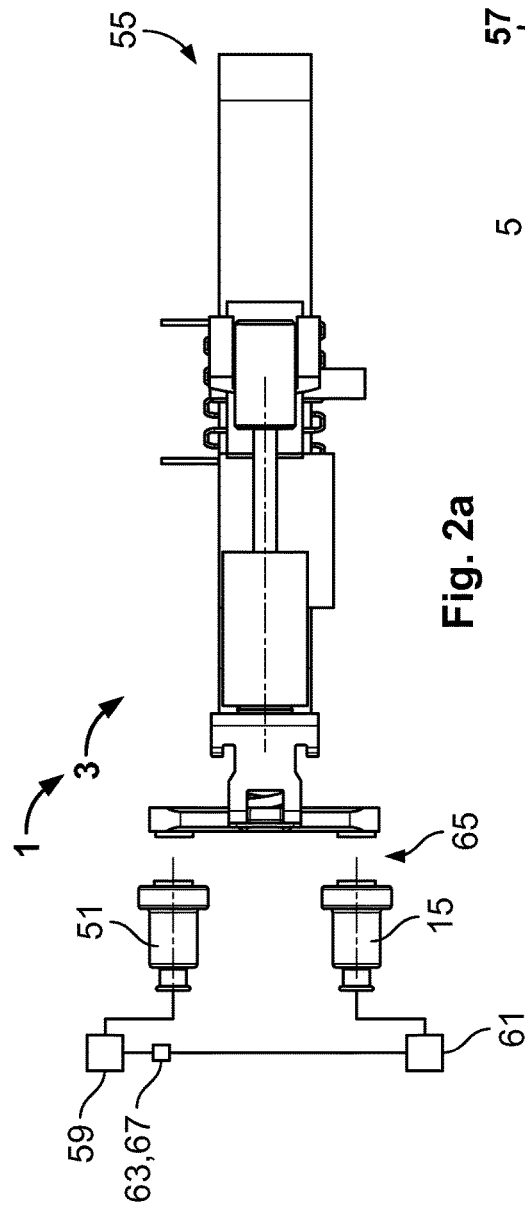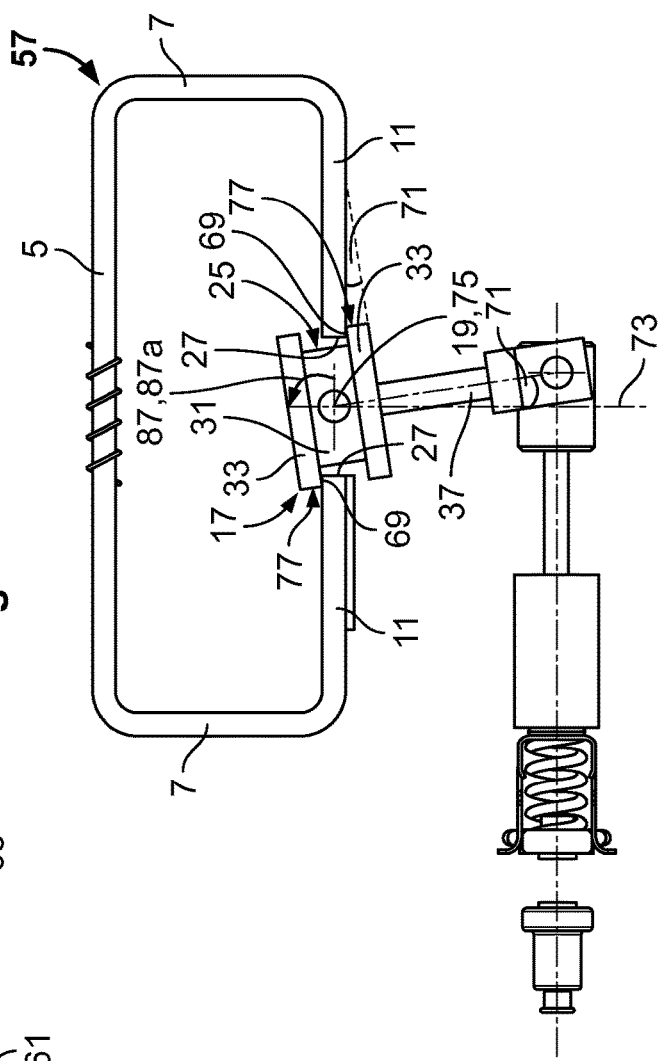

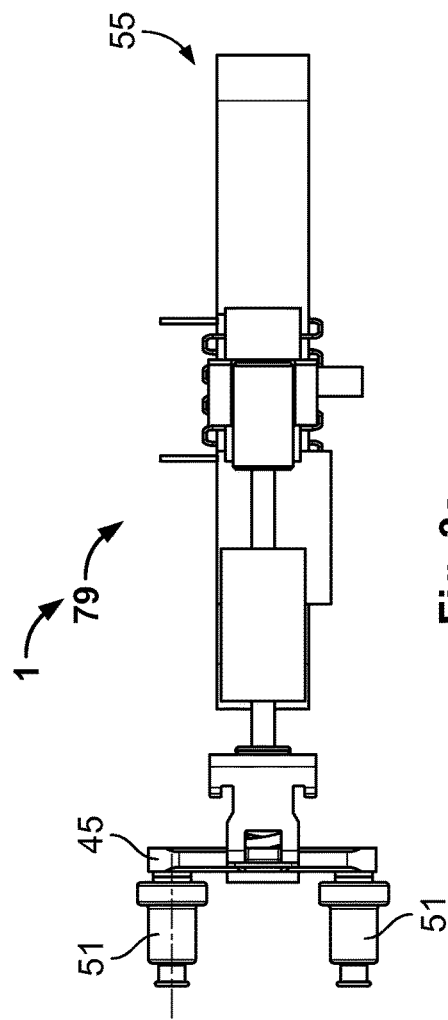
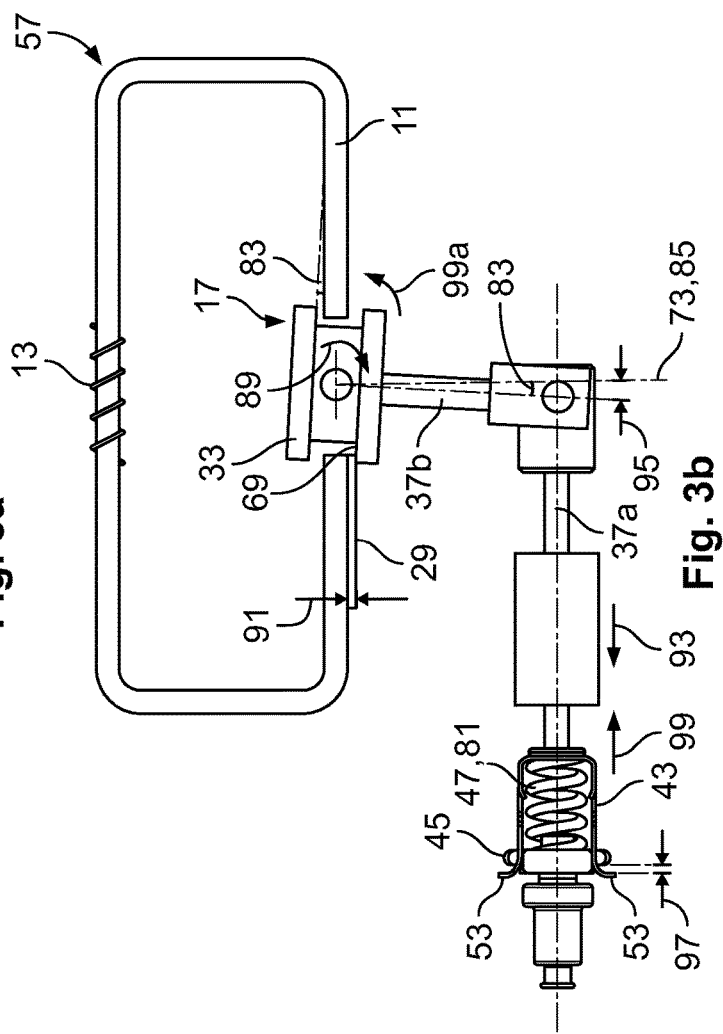

US 10,748,718 B2

POWER CONTRACTOR WITH HIGH MECHANIC SHOCK RESISTANCE

CROSS REFERENCE TO RELATED APPLICATION

This application claims the benefit of the filing date under 35 U.S.C. § 119(a)(d) of German Patent Application No. 102016211931.1, filed on Jun. 30, 2016.

FIELD OF THE INVENTION

The present invention relates to a contactor and, more particularly, to a power contactor for switching high voltages and/or high currents in electric vehicles.

BACKGROUND

An electric vehicle battery (EVB) or a traction battery is commonly used to power an electrical vehicle. These known EVB batteries are made up of a few hundred to a thousand individual cells, such that a single EVB battery may have several hundred volts. The currents supplied by the EVB battery can be several hundred amps.

In order to avoid the dangers of an electric shock from the EVB battery during an accident, so called pre-crash sensors (i.e. sensors that detect compression of the crumple zone of the vehicle before the body of the vehicle itself is deformed) disconnect the EVB battery from the electrical system in the event of a collision.

In this regard, however, it is necessary to guarantee disconnection of the EVB battery from the electrical system no matter the type of collision. As a result, it is important that contactors not malfunction in the event of thermal or mechanical shock.

The United Nations Economic Commission for Europe (UNECE) describes in ECER 100, inter alia, the regulations to be complied with regarding a single mechanical shock.

The required shock resistance of 28 G can be achieved with conventional solenoid plunger systems only when the contactor is in the closed position. A shock towards the closed position results in the contactor switching to the open position. Known solutions to this problem use two contactors, which are orientated perpendicularly to one another and connected in series, so that at least one contactor ensures a safe disconnection of the EVB battery from the electrical system.

There is a need to create a power contactor that performs the required shock resistance in any spatial direction.

SUMMARY

A power contactor having an electromagnetic driving unit, a rotating armature, and a reset element. The rotating armature is switched by the electromagnetic driving unit between an open position and a closed position. The reset element exerts a reset force onto the rotating armature when in the closed position.

BRIEF DESCRIPTION OF THE DRAWINGS

The invention will be explained in greater detail below with reference to embodiments, referring to the appended drawings, in which:

FIG. 2a is a side view of the power contactor of FIG. 1;

FIG. 2b is a top view of the power contactor of FIG. 2a;

FIG. 3a is a side view of a power contactor according to the invention, shown in the closed position;

FIG. 3b is a top view of the power contactor of FIG. 3a; and

DETAILED DESCRIPTION OF THE EMBODIMENT(S)

Embodiments of the invention will now be described in greater detail with reference to the drawings.

Figure 1:
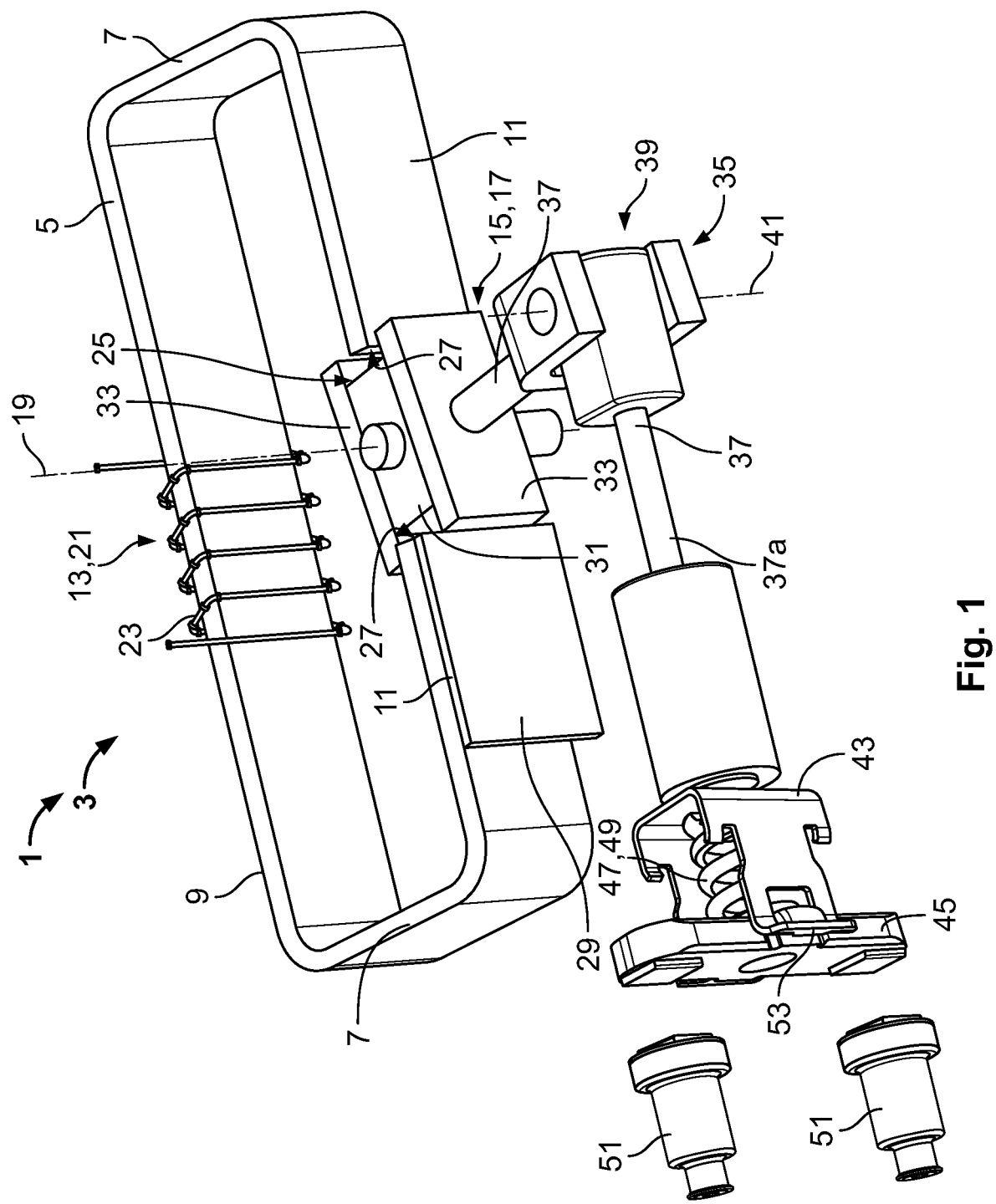
FIG. 1 is a perspective view of a power contactor according to the invention, shown in the open position.

Referring first to FIG. 1, a power contactor 1, according to the invention, is shown in an open position 3.

In the exemplary embodiment shown, the power contactor 1 generally includes a yoke 5, an electromagnetic driving unit 13, and a switch 15.

The yoke includes a pair of yoke legs 7, a yoke base 9, and a pair of end portions 11. As shown, the pair of yoke legs 7 are opposite each other with respect to opposite ends of the yoke base 9. The end portions 11 are opposite the yoke base 9 and connected to the pair of yoke legs 7, respectively. A switch receiving space 25 is between the pair of end portions 11, such that pole faces 27 of switch 15 point toward each other and into the switch receiving space 25. Furthermore, in the shown embodiment, a spacing element 29 is attached to one of the pair of end portions 11, along a side surface thereof.

The electromagnetic driving unit 13 is in the form of a coil 21, wherein a winding 23 of coil 21 is wrapped around the yoke base 9.

The switch 15 is a rotating armature 17 and is rotatable about a rotational axis 19. As shown in FIG. 1, the rotating armature 17 generally includes a permanent magnet 31 and two armature plates 33 that enclose this permanent magnet 31.

The power contactor 1 further includes a motion element 35 having a pair of support rods 37 movably connected to a hinge 39 for movement about a hinge axis 41.

In the shown embodiment, the power contactor 1 further includes a contact bridge carrier 43, a contact bridge 45, and a pair of contacts 51. The contact bridge carrier 43 is a solid structure having supporting portions 53 and is secured to one of the pair of support rods 37, such as a connecting rod 37a. The contact bridge carrier 43 generally includes a reset element 49 and rests against the contact bridge carrier 43. In the shown embodiment, the reset element 49 is a helical spring 47, by means of which the contact bridge 45 biases the contact bridge carrier 43. More specifically, the contact bridge 45 rests against the supporting portions 53 of the contact bridge holder 43. The pair of contacts 51 are spaced from the contact bridge 45 but positioned to correspond therewith.

With reference to FIGS. 2a and 2b, the power contactor 1 is shown in the open position 3 wherein there is no electrical connection between the contacts 51, which are connected to an EVB battery 59 and the electrical system 61. The EVB battery 59 is thus disconnected from the electrical system 61. An electrical switch 63 provides, in addition to the mechanical circuit disconnection 65, an electrical circuit disconnection 67.

In the top view 57, as shown in FIG. 2b, the structure of the rotational armature 17 (i.e., its construction) is made up of two armature plates 33 and the permanent magnet 31 and is symmetrically positioned around the rotational axis 19.

Moreover, FIGS. 2a and 2b show that each of the armature plates 33 rests on a respective end portion 11 of the yoke 5 by a stop 69.

The two stops 69 are points along the end portions 11 that are symmetrically arranged relative to the rotational axis 19. The two stops 69 define a rotation angle of the open position 71. This is marked between an auxiliary axis 73 and a connecting rod 37, but can also be found between the armature plates 33 and the end portions 11 of the yoke 5.

The rotational armature 17 is arranged in the switch receiving space 25 and the rotational axis 19 is in the center of gravity 75 of the rotating armature 17.

The pole faces 27 point towards the permanent magnet 31 and are aligned parallel to one another.

Moreover, FIGS. 2a and 2b show that the armature plates 33 project beyond the switch receiving space 25, at least in sections towards the end portion 11 of the respective yoke leg 7. This is shown in the regions 77.

With reference to FIGS. 3a and 3b, the power contactor 1 is shown in a closed position 79.

In the closed position 79, the contact bridge 45 establishes an electrical connection with the two contacts 51. The helical spring 47 is thereby compressed, such that it is in the tensed state 81. This can be identified from the top view 57 in that the contact bridge 45 no longer rests against the supporting portions 53 of the contact bridge carrier 43.

In the closed position 79 shown, the rotating armature 17 has a rotation angle of the closed position 83, which in turn is measured between the auxiliary axis 73 and the connecting rod 37 or between an armature plate 33 and an end portion 11 of the yoke.

Resulting from the spacing element 29, which rests a stop 69 of the rotating armature 17, the rotation angle of the closed position 83 of FIG. 3b is smaller than the rotation angle of the open position 71, which is shown in FIG. 2b.

The auxiliary axis 73 further characterizes a reverse rotation angle 85, with the rotating armature 17 being in an unstable equilibrium (not shown) when the connecting rod 37b is aligned precisely along the auxiliary axis 73. In this state, the magnetic opening force 87 (see FIG. 2b) and the magnetic closing force 89 would cancel each other out. The magnetic opening force or closing force 87, 89 are illustrated as curved arrows, because these forces bring about a rotation of the rotating armature 17. The precise direction of action of the magnetic forces 87, 89 is not illustrated, as these would have to be described by a vector field; only the effective direction of action on the rotating armature 17 is shown.

In order to avoid instability at the reverse rotation angle 85, the thickness 91 of the spacing element 29 is chosen in such a way that the connecting rod 37a moves beyond the reverse rotation angle 85 by a reverse distance 95 in the contacting direction 93.

The reverse distance 95 is less than a spring tension path 97, by which the helical spring 47 is compressed. Relaxation of the helical spring 47 results in movement of the connecting rod 37a beyond the reverse rotation angle 85 and towards the open position 3, wherein the rotating armature 17 has a magnetic opening force 87 (see FIG. 2b) when the supporting portion 53 is reached by the contact bridge 45. The magnetic opening force 87 is greater than the magnetic closing force 89. Consequently, the rotating armature 17 moves into the open position 3 if no force is exerted onto the rotating armature 17 by the electromagnetic driving unit 13 towards the closed position 79. A reset force 99 of the helical spring 47, which generates a reset moment 99a, thus causes the power contactor 1 to exhibit monostable behavior.

The magnetic opening force 87 corresponds to a holding force 87a.

Figure 4:
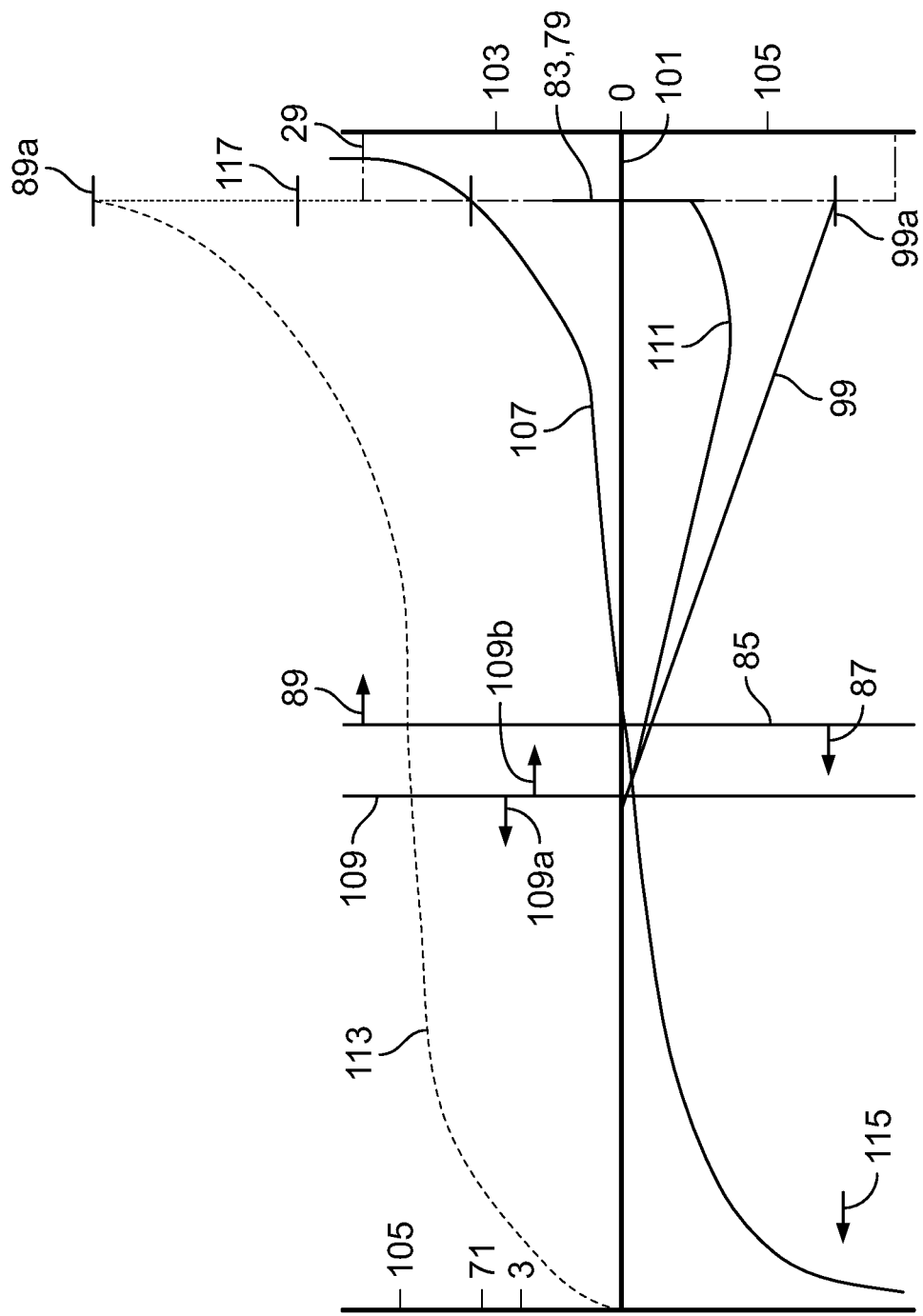
FIG. 4 is a diagram showing a rotation angle/force characteristic curve of the power contactor according to the invention.

In FIG. 4, a rotation angle/force characteristic curve of the power contactor 1 is shown. A rotation angle 101 is plotted on the horizontal axis, wherein a force 103 is exerted on the rotating armature (not shown) depending on the rotation angle 101. The force 103 is plotted on the horizontal axis.

FIG. 4 shows two maximal deflections 105, up to which the rotating armature 17 can be maximally tilted if no spacing element 29 is present. FIG. 4 shows both the rotation angle of the open position 71 as well as the rotation angle of the closed position 83, which, due to the spacing element 29 indicated, is smaller than the rotation angle of the open position 71.

A force path of the rotating armature 17 in a current free state is further shown, (i.e., a current free force path 107), which, at the reverse rotation angle 85, changes the effect of the force, (i.e., the direction) in which the rotating armature 17 is subjected to a force.

In the shown deflection force characteristic curve, positive values of the force 103 represent the magnetic closing force 89 and negative values of the force 103 represent the magnetic opening force 87.

The rotating armature 17 has an intermediate position 109 that is characterized when the contact bridge 45 contacts the contacts 51 (see FIGS. 3a and 3b). A change in the rotation angle 101 towards the rotation angle of the closed position 83 results in the helical spring 47 being compressed and exerting a reset moment 99a onto the rotating armature 17. This reset moment 99a is directed towards the open position 3 and shown in FIG. 4.

The intermediate position 109 separates a first angular region 109a from a second angular region 109b.

The magnetic closing force 89, which is shown in FIG. 4 on the right of the reverse rotation angle 85, is overcompensated by the reset force 99, such that a resulting force 111 arises after vectoral summation of the magnetic closing force 89 and the reset force 99.

It is important to note that the resulting force 101 merges into the curve progression of the magnetic opening force 87 in the region of the intermediate position 109, (i.e., does not intersect the horizontal axis), which represents the rotation angle 101. This curve progression means that for each possible rotation angle 101, a negative force 103 acts on the rotating armature 17, which moves it towards the open position 3.

In order to move the rotating armature 17 from the open position 3 to the closed position 79, it is necessary to compensate the magnetic opening force 87 which is exerted by the permanent magnet 31, or to overcompensate it into a magnetic closing force 89. This is achieved by applying an electrical voltage or feeding an electrical current into the electromagnetic driving unit 13, by means of which a magnetic field which is directed against the magnetic field of the permanent magnet 31 is generated, such that the rotating armature 17 moves towards the closed position 79.

A force path 113, which is receiving a supply of current, is shown as a dashed line in FIG. 4. In order to compensate the asymptotic behavior 115 of the current free force path 107 in the region of the open position 3, it is necessary to apply or feed a high voltage or high currents to the electromagnetic driving unit 13. Such an increased voltage or increased current results in an excess force 117. The excess force 117 arises from the magnetic closing force of the closed position 89a, reduced by the reset force of the closed position 99a. For the sake of clarity, the force path 113, which is receiving a supply of current and which is corrected by the reset force 99 of the spiral spring 37, is not shown.

The excess force 117 can be avoided by using sensors that detect when the rotating armature 17 is approaching the closed position 79. This may be evaluated by a control element that reduces the voltage applied to the electromagnetic driving unit 13 or the current fed in such a way that only a minimum level of excess force 117 holds the rotating armature 17 in the closed position 79.

The force paths 99, 107, 113 which are shown in FIG. 4 are only to be understood as figurative curves for illustrating the active principle of the power contactor 1 according to the invention, (i.e., the rotation angle/force characteristic curves shown) and should not be regarded as being to scale.

As shown, the rotating armature 17 does not move more linearly along a predetermined direction and accordingly has a mass inertia along this or counter to this direction, but rather exerts a rotational movement.

As already mentioned above, the power contactor 1 according to the invention is designed for high voltages and/or high currents. High currents should be understood to be current strengths in the region of several hundred amps and high voltages should be understood to be several hundred volts. The electric vehicles in which the power contactor 1 according to the invention can be used are preferably purely electrically powered or hybrid passenger vehicles, electric scooters, electrically powered buses or heavy good vehicles.

In the event of an accident, the open position 3 of the power contactor 1, (i.e., the disconnection of the EVB battery 59 from the electrical system 61 for example), is the operating state of the power contactor 1, in order to rule out danger to the occupants and/or rescue workers from the voltage or currents from the EVB battery 59.

At least one spring element can be used as a reset element 49. However, it is also conceivable that two permanent magnets which repel one another can be used as a reset element 49. In the closed position 79, the reset elements transmit a reset moment 99a onto the rotating armature 17, which is directed towards the open position 3 of the rotating armature 17. Hereinafter, if forces which act on the rotating armature 17 are referred to, these generate a torque which can cause a rotation of the rotating armature 17.

Furthermore, in one configuration of the power contactor 1 according to the invention, the rotating armature 17 is rotatable into a rotation angle 101 of the open position 3 and a rotation angle 101 of the closed position 79, wherein a rotation angle 101 corresponds to the angle between the at least one armature plate 33 and the shortest straight connecting line between the two pole faces 27 and wherein the rotation angle 101 of the open position 3 is greater than the rotation angle 101 of the closed position 79. The different rotation angles of the closed position 79 or the open position 3 can make the power contactor 1 monostable. This can be desirable if a defined state is to be consistently occupied when the current of the power contactor 1 is switched off.

A placement of the rotating armature 17 in which the armature plate 33 is parallel to the end portions 11 of the yoke 5 is used hereinafter as a reference for a zero degree position. The rotation angles of the open or closed positions correspond to a rotation of the rotating armature 17 clockwise or anticlockwise starting from a rotation angle 101 of 0°. The rotation angle 101 of the open position 3 is thus measured using an opposite direction of rotation relative to the rotation angle 101 of the closed position 79.

In a further configuration of the power contactor 1, an intermediate position 109 of the rotating armature 17 between the open and the closed positions, a first angular region 109a of the rotating armature 17 between the rotation angles of the open and the intermediate positions, and a second angular region 109b of the rotating armature 17 between the rotation angles of the intermediate and the closed positions are provided, wherein the reset element 49 exerts a reset force 99 on the rotating armature 17 towards the open position 3 at least in the second angular region 109b.

The intermediate position 109 thus characterizes that rotation angle 101 of the rotating armature 17 from which, upon further rotation towards the closed position 79, the reset element 49 counteracts further rotation towards the closed position 79.

The rotating armature 17 can be configured monostable, such that, in a state in which no current is being supplied to the power contactor 1, the rotating armature 17 rotates from the closed position 79, in particular from the second angular region 109b, into the open position 3.

In a further configuration of the power contactor 1 according to the invention, a reset moment 99a directed into the open position 3 acts on the rotating armature 17 in each rotational position of the rotating armature 17.

If the forces which act on the rotating armature 17 are considered individually, the permanent magnet 31 can exert a magnetic opening force 87, between the rotation angle 101 of the open position 3 and a reverse rotation angle 85, towards the open position 3 of the rotating armature 17, and a magnetic closing force 89, between the reverse rotation angle 85 and the rotation angle 101 of the closed position 79, towards the closed position 79 onto the rotating armature 17. For every rotation angle 101 between the reverse rotation angle 85 and the rotation angle 101 of the closed position 79, the reset force 99 of the reset element 49 can be greater than the magnetic closing force 89. This has the advantage that the power contactor 1 has monostable behavior, (i.e., it consistently reverts to the open position 3 when the current is switched off).

If, for example, the power contactor 1 is considered in the current free state and without the effect of the reset element 49, a power contactor 1 configured in such a manner has bistable behavior. Both in the open as well as in the closed position 79, the permanent magnet 31 attracts the end portions 11 of the yoke 5 and holds the rotating armature 17 in this position. A rotation of the rotating armature 17 from one of the two positions is possible as long as the magnetic attraction force 101 is overcome by an opposing force 101.

The reverse rotation angle 85 is to be understood as that rotation angle 101 of the rotating armature 17 at which the rotating armature 17 is in an unstable equilibrium. This means that the magnetic attraction of the permanent magnet 31 to the two end portions 11 is identical. A minor deflection of the rotating armature 17 consequently results in the deflection of the rotating armature 17 into the corresponding position.

In order to avoid such an unstable equilibrium, it is important that the reverse rotation angle 85 of the rotating armature 17 is different from the rotation angle 101 of the intermediate position 109. At the reverse rotation angle 85 of the rotating armature 17, a reset force 99 can already be exerted onto the rotating armature 17 towards the open position 3 by the reset element 49. This thus makes it possible, both in the first as well as in the second angular region 109b of the rotating armature 17, for either the magnetic opening force 87 or the resulting vectoral sum of the reset force 99 of the reset element 49 and the magnetic closing force 89 of the permanent magnet 31 to move the rotating armature 17 into the open position 3.

In a further configuration of the power contactor 1 according to the invention, the rotating armature 17 is hingedly connected to a contact bridge 45 using at least one axis and at least one connecting rod 37. The linkage of the contact bridge 45 using at least one axis and at least one connecting rod 37 has the advantage that the contacting region, (i.e., the region in which an electrical connection between two contact elements can be produced using the contact bridge 45), can be spatially separated from the electromagnetic driving unit 13 by an insulator.

The current strength of the currents conducted in the closed state is usually regulated by pulse width modulation PWM. During generation of the high current PWM, the steep flanks of the current increase and decrease causing high frequency harmonic waves on the electrical connection points, which can couple into electrical connections of the low voltage system located nearby. These interferences can then spread out over all lines and ultimately interfere with communication systems or radio, for example.

Due to the construction, in the case of solenoid plunger systems, the high voltage system and the low voltage system are very close together, which causes strong coupling. For this reason, these induced interferences must be blocked in the drive circuit of the contactors for these relays.

As the electromagnetic driving unit 13, (i.e., the coil 21 of the power contactor 1) according to the invention, for example, can be spatially separated from the contact bridge 45, induced electromagnetic interferences elicited by the switching processes can be minimized or eliminated entirely.

This construction also has the advantage of reduced development of noise when switching. The volume when switching is a function of the masses moved, the forces, and the dampening of structure borne noise. Solenoid plunger systems for large switching capacities have heavy armatures, large forces, and the noise can be transmitted well using the rigid iron circuit to the environment. As a result, such contactors are loud. In comparable systems with rotating armatures, the armature mass and also, due to the lever translation, the path can be smaller. Therefore, the kinetic energy absorbed and emitted partially on impact as sound decreases.

The power contactor 1 can have two connecting rods, which can be connected to one another using a hinge axis 41 that is arranged parallel to the rotating axis. The connecting rods 37 can be substantially positioned at an angle of 90° with respect to one other. Preferably, the connecting rod 37 to which the contact bridge 45 is directly or indirectly fixed can be arranged parallel to the end portions 11 of the yoke 5.

Preferably, the movement of this connecting rod 37 can take place in the plane of the yoke 5.

In a further configuration of the power contactor 1 according to the invention, the switch 15 bridge has at least one reset element 49, which, in the closed position 79, generates a reset force 99 which acts on the rotating armature 17 towards the open position 3. This has the advantage that it is not necessary to attach the at least one reset element 49 to the rotating axis or to the rotating armature 17 itself. Thus, the reset element 49 can be arranged outside of the power contactor 1, preferably in the form of a spiral or leaf spring. This enables simplified maintenance or simple exchange of the reset element 49, for example.

The reset force 99, which acts on the rotating armature 17 towards the open position 3 from the reset element 49 of the switch 15 bridge, can be transmitted using the connecting rod 37 or connecting rods and the hinge axis 41 onto the rotating armature 17.

The switch 15 bridge can be held by a switch 15 bridge support, wherein the switch 15 bridge can rest against the switch 15 bridge support using the reset element 49.

In a further configuration of the power contactor 1 according to the invention, a holding force 87a exerted on the rotating armature 17 is, at least in the open position 3, at least 100 times the weight of motion elements 35, which are connected to the rotating armature 17. This has the advantage that the regulations set out by the United Nations Economic Commission for Europe for the shock resistance of electrical components can be met. The motion elements 35 can be the two connecting rods and the hinge axis 41 connecting these connecting rods as well as the contact bridge 45 or the system consisting of the contact bridge 45, the reset element 49, and the contact bridge holder 43.

If the power contactor 1 is in the open position 3, for example, and forced in such a way that the inertia of the motion elements 35 exerts a torque onto the rotating armature 17, which moves the power contactor 1 towards the closed position 79, the acceleration can be at least 100 G without the torque being exceeded. Preferably, the power contactor 1 can maintain the open position 3 of the rotating armature 17, even at greater accelerations.

The foregoing illustrates some of the possibilities for practicing the invention. Many other embodiments are possible within the scope and spirit of the invention. The disclosed invention utilizes the above identified components, as a system, in order to more efficiently construct a display system 1 for a particular purpose. Therefore, more or less of the aforementioned components can be used to conform to that particular purpose. It is, therefore, intended that the foregoing description be regarded as illustrative rather than limiting, and that the scope of the invention is given by the appended claims together with their full range of equivalents.

What is claimed is:

1. A power contactor, comprising:
   an electromagnetic driving unit;
   a rotating armature switched by the electromagnetic driving unit between an open position and a closed position, a rotation angle of the rotating armature in the open position is greater than a rotation angle of the rotating armature in the closed position, the rotating armature is rotatable about a rotational axis extending through a center of gravity of the rotating armature; and
   a reset element exerting a reset force onto the rotating armature when in the closed position.

2. The power contactor according to claim 1, further comprising a yoke connected to the electromagnetic driving unit.

3. The power contactor according to claim 2, wherein the yoke includes a yoke base and a pair of yoke legs extending from opposite ends of the yoke base.

4. The power contactor according to claim 3, wherein:
   (a) each yoke leg has a pole face on an end portion thereof, and
   (b) the rotating armature is between the pole faces.

5. The power contactor according to claim 4, wherein the electromagnetic driving unit includes a coil wound about the yoke base.

6. The power contactor according to claim 4, wherein the yoke has a switch receiving space between the end portions of the yoke legs in which the rotating armature is positioned.

7. The power contactor according to claim 6, wherein the rotating armature includes a permanent magnet and an armature plate secured to the permanent magnet.

8. The power contactor according to claim 7, wherein the rotating armature includes a pair of stops, one of the pair of stops abutting the rotating armature when positioned in the open position.

9. The power contactor according to claim 8, wherein the other of the pair of stops abuts the rotating armature when positioned in the closed position.

10. The power contactor according to claim 9, wherein the rotational axis of the rotating armature crosses the rotating armature between the pole faces.

11. The power contactor according to 10, wherein the armature plate extends toward the pair of yoke legs.

12. The power contactor according to claim 11, wherein the armature plate extends beyond the switch receiving space.

13. The power contactor according to claim 2, further comprising a spacing element positioned between the yoke and the rotating armature.

14. The power contactor according to claim 1, wherein the reset element exerts a reset force onto the rotating armature towards the open position when the rotating armature is an intermediate position.

15. The power contactor according to claim 1, further including a contact bridge to which the rotating armature is hingedly connected.

16. The power contactor according to claim 15, wherein the reset element is positioned in the contact bridge.

17. A power contactor, comprising:
an electromagnetic driving unit;
a rotating armature switched by the electromagnetic driving unit between an open position and a closed position, the rotating armature is rotatable about a rotational axis extending through a center of gravity of the rotating armature, the rotating armature includes a permanent magnet and an armature plate secured to the permanent magnet;
a reset element exerting a reset force onto the rotating armature when in the closed position;
a yoke connected to the electromagnetic driving unit, the yoke includes a yoke base and a pair of yoke legs extending from opposite ends of the yoke base, each yoke leg has a pole face on an end portion thereof the rotating armature is between the pole faces, the yoke has a switch receiving space between the end portions of the yoke legs in which the rotating armature is positioned, the rotating armature includes a pair of stops, one of the pair of stops abutting the yoke when positioned in the open position and the other of the pair of stops abuts the yoke when positioned in the closed position, the rotational axis of the rotating armature crosses the rotating armature between the pole faces, the armature plate extends toward the pair of yoke legs and beyond the switch receiving space; and
a spacing element positioned between the yoke and the rotating armature, a rotation angle of the rotating armature in the open position is greater than a rotation angle of the rotating armature in the closed position.

18. The power contactor according to claim 17, wherein the reset element exerts a reset force onto the rotating armature towards the open position when the rotating armature is an intermediate position.

19. A power contactor, comprising:
an electromagnetic driving unit;
a rotating armature switched by the electromagnetic driving unit between an open position and a closed position, a rotation angle of the rotating armature in the open position is greater than a rotation angle of the rotating armature in the closed position;
a reset element exerting a reset force onto the rotating armature when in the closed position; and
a contact bridge to which the rotating armature is hingedly connected.

20. The power contactor according to claim 19, wherein the reset element is positioned in the contact bridge.

* * * * *